March 6, 1951  J. D. DAVIS  2,543,834
WORK LOADING MEANS FOR MACHINE TOOLS
Filed Dec. 2, 1947  2 Sheets-Sheet 1

Inventor
John D. Davis

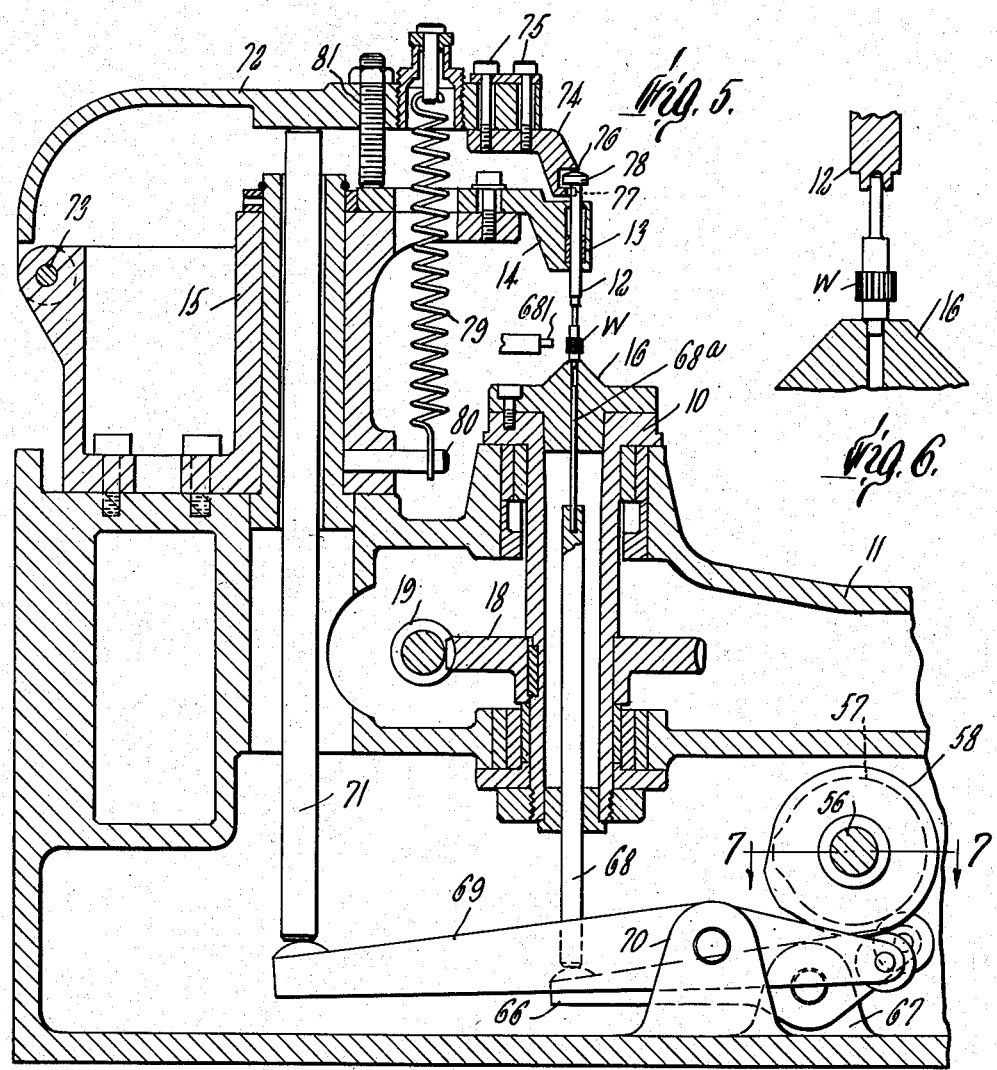
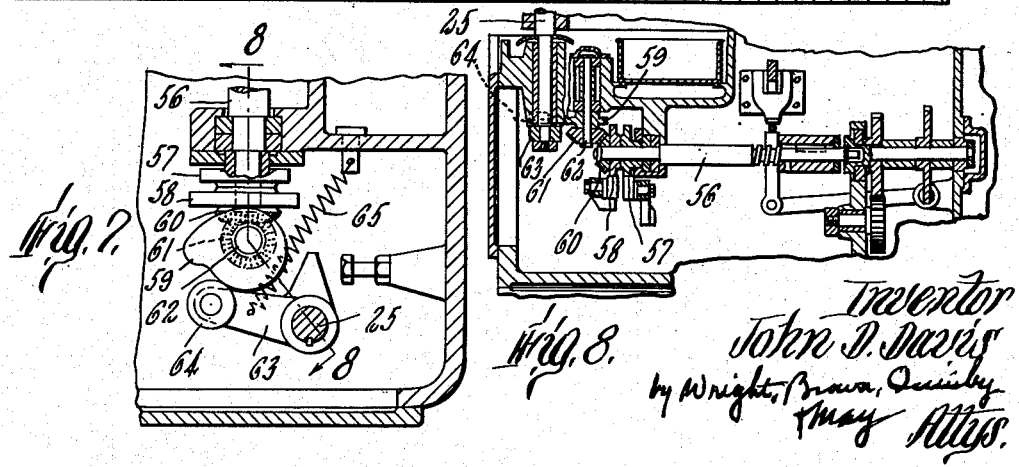

Patented Mar. 6, 1951

2,543,834

UNITED STATES PATENT OFFICE 2,543,834

WORK LOADING MEANS FOR MACHINE TOOLS

John D. Davis, Charlestown, N. H., assignor to The Fellows Gear Shaper Company, Springfield, Vt., a corporation of Vermont Application December 2, 1947, Serial No. 789,171

7 Claims. (Cl. 90—1)

This invention relates to metal cutting machines for operating on blank work pieces to produce finished articles, and is particularly concerned with means for holding a number of blank work pieces and automatically bringing them successively into the position adjacent to the cutting tool where the cutting operation on them is performed. An important object of the invention is to enable the blank holding portion, or the magazine, of the loading mechanism to be replenished from time to time without stopping the machine and with more or less long intervals between replenishments. A further object is to provide a simple and efficient means for delivering work pieces from the reserve supply holder or magazine to the operating holder, including a minimum number of parts and those parts of rugged construction. Other objects, related to the foregoing, appear from the following description of an illustrative embodiment of the invention.

The invention comprises in its main essentials the combination with an operating work holder and a cutting tool of a magazine in which a reserve supply of blank work pieces is contained, a carrier on which the magazine is mounted and by which it is shifted toward and away from the operating holder, feeder mechanism by which a work piece is caused to be placed at a delivering point in the magazine and transferred therefrom to the work holder in the course of each feeding action, and an auxiliary loader or cartridge which may be filled with blank work pieces apart from the machine and easily connected with the loading magazine for transfer of a replenished supply of blanks thereto.

The embodiment of the invention herein illustratively disclosed has been designed for use in combination with a machine for generating small pinions and gears, having a rotatable spindle and associated tail stock as the operating work holder, a circular gear shaper cutter and a rotatable and endwise reciprocable cutter spindle on which the cutter is secured and by which it is given characteristic movements of rotation and endwise reciprocation for generating and cutting teeth on the blank work pieces.

In the accompanying drawings:

Fig. 5 is a sectional view of the operating work holder and associated parts taken on line 5—5 of Fig. 1;

Fig. 6 is a detail view enlarged of a work piece and contiguous parts of the work spindle and tail stock by which it is supported in operative relation to the cutter;

Fig. 7 is a detail sectional view taken on line 7—7 of Fig. 5 showing part of the means for actuating the tail stock and work ejector;

Fig. 8 is a sectional view taken on line 8—8 of Fig. 7.

Like reference characters designate the same parts wherever they occur in all the figures.

Figure 1:
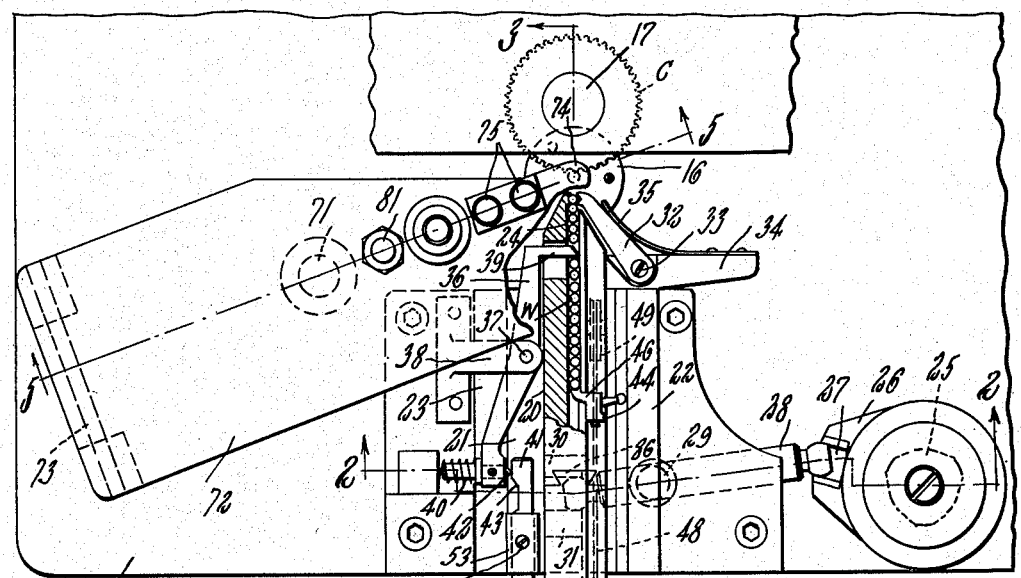
Fig. 1 is a plan view of the work holding portion of the machine, parts thereof being shown in section, and a plan view of the cutter and cross section of the cutter spindle.
Figure 2:
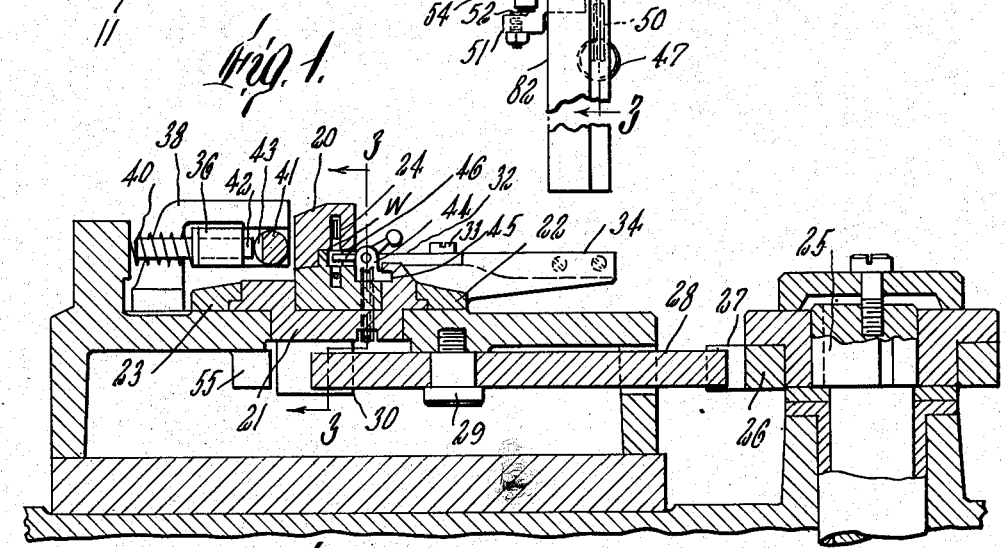
Fig. 2 is a cross section of the work holding portion of the machine taken on line 2—2 of Fig. 1.

The operating work holder comprises a work spindle 10 rotatably mounted in the machine base 11 and a tail stock or centering device 12 which is supported in a bearing 13 so that it can rotate, and also move toward and away from the adjacent end of the spindle, in axial alinement with the spindle. Bearing 13 is held in a bracket 14 secured to a fixture 15 mounted on the machine base. Any one of a number of work pieces W is grasped between the tail stock 12 and an adapter 16 secured to the spindle 10.

A circular gear shaper cutter C is secured to a cutter spindle 17 adjacent to the work piece and is reciprocated to perform its cutting action. Both the cutter and work spindle are rotated in harmony so that the pitch lines of the cutter and work piece travel at the same speed and in the same direction at their point of tangency. Mechanism of well known character is provided for reciprocating the cutter spindle and for thus rotating the spindles, a part of which is indicated in Fig. 5 as a worm gear 18 secured to the work spindle and a worm 19 meshing with it.

The means for holding a reserve supply of blank work pieces and feeding such work pieces to the work spindle comprise a magazine 20 and a magazine carrier or work slide 21 to which the magazine is secured. The carrier is mounted on the machine base 11 between guides 22 and 23 to reciprocate toward and away from the axis of the work spindle; and the magazine has a channel 24 parallel to the guides and radial to the work spindle axis suitably shaped to support a row of blank work pieces with their axes parallel to the work spindle axis. The magazine is detachable from the carrier 21 to permit substitution of other interchangeable magazines adapted to contain specifically different blanks.

Figures 3, 4:
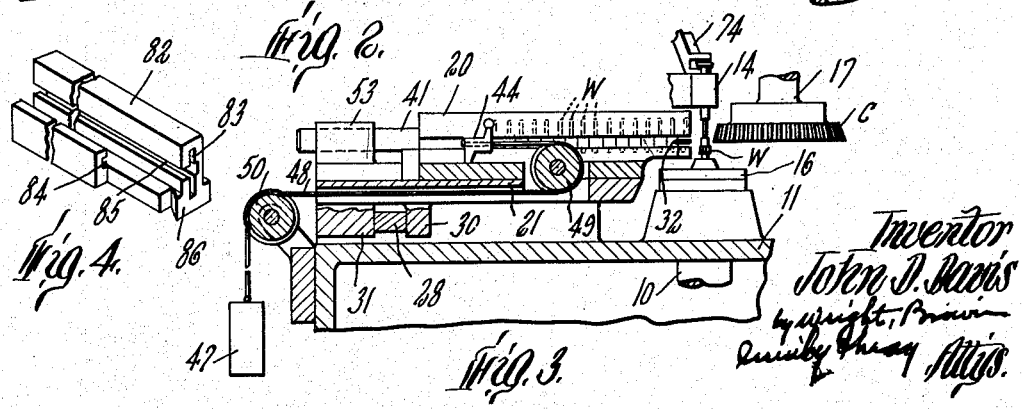
Fig. 3 is a longitudinal section taken on line 3—3 of Figs. 1 and 2.
Fig. 4 is a perspective view of a cartridge for replenishing the blank holding magazine.

Normally the magazine is held in a retracted position clear of the work spindle and tail stock. It is advanced toward the work spindle axis to deliver work pieces, and retracted therefrom, by a shaft 25 carrying a lever element in the form of a disk 26 having a notch 27, and a lever 28 connected to the machine base by a pivot 29, the opposite arms of which are contained, respectively, in the notch 27 and between lugs 30 and 31 (Fig. 3) depending from the carrier 21. Shaft 25 is rotated forward and back through an angle of appropriate magnitude at the proper time in the cycle of the machine by mechanism later described.

A gripper dog 32 is connected by a pivot 33 to a lateral arm 34 on the carrier 21 and extends into the delivery end of the channel 24 past a cut away part of the nearer side of the magazine toward the opposite bounding wall of the channel 24 and near the rear end of that wall. Its extremity next to the bounding wall is formed with a notch suitably disposed to receive the endmost one of a series of work pieces in the magazine and hold it against the opposite wall under the pressure of a spring 35 mounted on arm 34. Dog 32 thus serves as a retainer to hold the blank with which it is engaged in a definite location at the outlet of the magazine but is yieldable to permit removal of the blank by superior force; and also to admit blanks into its notch when the blanks are advanced by the feeder member next described.

Such feeder member is a lever 36 pivoted at 37 to a bracket 38 which is secured to the machine base beside the carrier 21 and overlies a part thereof. One arm of lever 36 extends toward the rear end of the magazine and carries a finger 39 projecting through an opening in the side of the magazine and having a wedge shaped extremity disposed so as to enter between two of the blank work pieces in the channel 24. In thus entering from a withdrawn position, the finger 39 advances the work pieces located between it and the dog 32 toward the work spindle axis, thus acting as the feeder proper. The other arm of lever 36 is pressed upon by a spring 40 toward a cam member 41 carried by the carrier 21. The side of the cam member 41 which faces toward lever 36 is engaged by a follower element 42 on the lever, and has an inclined surface 43 arranged to permit withdrawing movement of the finger 39 by spring 40 when the magazine is advanced toward the work spindle axis and to advance the finger into separating and propelling relation to the blanks when the magazine is withdrawn. This cam member is a bar mounted in a sleeve 53 on the carrier, in which it is adjustable lengthwise of the path of the slide and is secured by a set screw 54.

A pusher or follower 44 is mounted to travel in a guideway 45 formed by adjacent portions of the magazine 20 and carrier 21 and has a finger 46 extending through the side of the magazine into the channel 24 in front of the outermost one of the series of work pieces. This follower is actuated by a weight 47, to which it is connected by a cord 48 passing around guide pulleys 49 and 50, to exert pressure on the row of blanks toward the spindle.

The slide or carrier 21 is provided with a bracket 51 near its forward end in which an adjustable rearwardly projecting stop screw 52 is mounted in a location below the protruding shank of the cam bar 41. A fixed abutment 55 is located on the stationary structure of the machine in the path and to the rear of bracket 51 and the set screw is adjusted to engage the abutment and to limit the rearward travel of the carrier when the work piece which is held by the gripper 32 is correctly alined with the work spindle.

The actuating lever 28 for the carrier and its points of engagement therewith and with the actuating arm 28, and its fulcrum pivot, are so correlated that the lever is put under appreciable bending stress when the slide is arrested by the stop, to prevent rebound and insure accurate alinement of the endmost blank with the work spindle.

For correlating the movements of the magazine actuating shaft 25 with other phases of the cycle of the machine, a shaft 56 is driven by the power source which imparts rotation to the work spindle and the cutter spindle, at a definite speed ratio, in this instance one to one, with the rotation of the work spindle. Shaft 56 carries two cams 57 and 58, each having a single protuberant lobe, and drives a third cam 59 by means of a bevel gear pair 60, 61 and a shaft 62 on which cam 59 is mounted. An arm 63 is secured to the magazine actuating shaft 25 and carries a follower roll 64 which is held against the circumference of cam 59 by a spring 65 connected with the arm 63 and with an anchorage on the machine frame.

Cam 57 acts on a lever 66, pivoted to a bracket 67 on the machine base and having an arm arranged to exert force endwise on an ejector rod 68 which extends along the axis of the work spindle 10 and has an extension rod 68a in the axial bore of the adapter 16 which holds one end of the work piece.

Cam 58 acts on a lever 69, pivoted to a bracket 70 in the machine base and arranged to impart movement endwise to a lifter rod 71 which passes through a guideway in the fixture 15 and is arranged to thrust against a lever 72, having the form of a hood, which is connected by a pivot 73 with a part of the fixture 15. A tail stock actuator 74 is connected adjustably to the lever 72 by bolts 75 and is provided with a shoulder 76 overlying, and a claw 77 underlying, a head or flange 78 on the tail stock 12. A spring 79 is coupled with the lever 72 and with a fixed anchor member 80 and is arranged to exert force on the lifter rod 71 in opposition to that exerted by cam 58 through lever 69. An adjustable stop 81 carried by lever 72 is arranged to set a variable limit to the movement of the lever under the force of the spring. The tail stock actuator is arranged to exert force on the tail stock toward the work spindle, and against an interposed work piece when spring 79 is free to act; and the claw 77 of the actuator withdraws the tail stock from the spindle and work piece when cam 58 displaces lever 72 by lifter rod 71.

The cams 57, 58 and 59 are constructed and timed to withdraw the tail stock and advance the ejector 68a, when the work spindle has completed a generating rotation, thus releasing the previously held finished work piece and allowing it to be knocked off by a blast of air from a nozzle 68I; then permit withdrawal of the ejector, hold the tail stock retracted, and rotate the shaft 25 counter-clockwise (with respect to Figs. 1 and 7) to bring the magazine into delivering position, while the tail stock is withdrawn; then permit advance of the tail stock by spring 79 to engage the rearmost work piece in the magazine and bring the work piece into connection with the spindle, while the magazine carriage pauses; and finally to permit return of the magazine carriage by the action of spring 65.

In the course of the advancing movement of the magazine carriage toward the work spindle, the inclined surface 43 of cam bar 41 is displaced past the follower element of lever 36, whereby the feed finger 39 is withdrawn by spring 40 from the channel 24 which contains the blank work pieces, and the row of blanks back of the finger 39 is moved up by the pusher 44 to close the gap left by the withdrawal of the finger. During withdrawing movement of the magazine carrier, the clamping dog 32 is withdrawn from the work piece which it previously held and which is now held by the spindle and tail stock, and the cam surface 43 then shifts the lever 36 so as to advance the feed finger 39 between two of the blanks and thereby cause advance of the blanks lying between it and the dog 32, through a distance sufficient to bring the endmost blank into the notch of dog 32, the latter being displaced by the blank against the yielding resistance of spring 35. This feeding effect is due partly to movement of the magazine after advance of the feed finger and partly to the wedge form of the finger; but the mechanism may be organized to produce the effect by either of these agencies alone.

The movement imparted to the magazine carriage must be at least as great as the diameter of a single blank, and may be any greater amount that suffices to effect withdrawal and penetration of the fed finger 39 in the manner described, and feeding of the blanks.

An important feature of the invention is a magazine loader or cartridge detachably connected with the magazine 20 and adapted to be disconnected therefrom and filled with blank work pieces when so detached. Such a cartridge, designated 82, is shown in Fig. 1 as connected to the magazine and in Fig. 4 as detached therefrom. In the embodiment here shown, it is an elongated structure having a longitudinal channel 83, like the channel 24 in the magazine, for holding a row of blanks, a guideway 84 for the pusher 44, and a lateral slot 85 communicating with the channel 83 to receive the arm 46 of the pusher. An undercut tongue 86 formed on one end of the cartridge is adapted to enter a complemental notch in the outer end of the magazine, forming in effect a dovetail joint appropriately located to aline the channel 83 with channel 24 and the pusher guideway 84 with the guideway 45. Channel 83 and slot 85 are open at both ends of the cartridge. Before a filled cartridge is connected with the magazine, the pusher or follower 44 is withdrawn from the guideway 45. Then the cartridge is connected with the magazine by the means described and the follower entered in the outer end of guideway 84 with its arm protruding into the channel 83. The cartridge partakes of the movements of the magazine in delivering blanks to the work spindle, and the blanks are propelled by the follower into the magazine correspondingly. When all have been transferred from the cartridge to the magazine, the cartridge is removed and refilled, or a previously filled cartridge can be substituted for an exhausted one.

The provision of such detachable cartridge facilitates replenishment of the magazine and enables replenishment to be effected without stopping the machine. One attendant may in this way keep a number of machines in continuous operation.

Although the disclosure here has been made in terms of a specific gear generating shaping machine, it is to be understood that the principles of the invention may be applied to various other machines by which finished articles of various kinds are made from blanks.

What I claim is:

1. In a machine tool the combination with an operating work holder and correlated cutting tool, of a magazine constructed to hold a series of blank work pieces, means for reciprocating said magazine to a position in which the endmost one of the blanks carried by the magazine is in register with the operating work holder and away from that position, means for causing the operating work holder to engage and retain such endmost blank when the magazine is in the position named, a cartridge detachably connected with the magazine having provisions for holding a reserve supply of blanks and an outlet communicating with the magazine for passage of the blanks, a pusher arranged to bear on the outermost one of the series of blanks contained in the cartridge and yieldable force applying means engaged with said pusher for exerting force thereby on the series of blanks toward the delivery outlet of the magazine; the magazine and cartridge having alined communicating guideways for the pusher and the cartridge having an entrance at its outer end for reception of the pusher.

2. In a machine tool the combination with an operating work holder and correlated cutting tool, of a magazine constructed to hold a series of blank work pieces, means for reciprocating said magazine to a position in which the endmost one of the blanks carried by the magazine is in register with the operating work holder and away from that position, means for causing the operating work holder to engage and retain such endmost blank when the magazine is in the position named, a pusher arranged to bear on the outermost one of the series of blanks contained in the magazine, yieldable force applying means engaged with said pusher for exerting force thereby on the series of blanks toward the delivery outlet of the magazine, and a cartridge detachably connectible with the magazine adapted to hold a reserve supply of blanks and having a delivery outlet arranged to register with the blank-holding space of the magazine when the cartridge is connected with the magazine; said pusher being retractable from the magazine and placeable in the cartridge for transmitting force on the blanks held by the cartridge toward the magazine.

3. The combination with a machine tool having an operating work holder and a cutting tool correlated with the work holder for performing an operation on work pieces held by said holder, of a magazine having a channel adapted to contain a row of blank work pieces open at one end for delivery of such work pieces, means for reciprocating said magazine in a path and through a distance so disposed as to place the delivery end of the magazine in register with the work holder and withdraw it therefrom, a dog mounted for movement with the magazine located, and yieldably actuated, to hold the endmost blank in said channel in a definite position with respect to the delivery end of the channel, a feeder element mounted adjacent to the magazine and movable back and forth across the blank-containing channel thereof, and means for withdrawing said feeder element from the channel when the magazine is advanced toward the work holder and projecting it across the channel when the magazine is withdrawn, for advancing the next blank of the series into gripped engagement with said dog.

4. The combination with a machine tool having an operating work holder and a cutting tool correlated with the work holder for performing an operation on work pieces held by said holder, of a magazine having a channel adapted to contain a row of blank work pieces open at one end for delivery of such work pieces, means for reciprocating said magazine in a path and through a distance so disposed as to place the delivery end of the magazine in register with the work holder and withdraw it therefrom, a dog mounted for movement with the magazine located, and yieldably actuated, to hold the endmost blank in said channel in a definite position with respect to the delivery end of the channel, a feeder element mounted adjacent to the magazine and movable back and forth across the blank-containing channel thereof, means for withdrawing said feeder element from the channel when the magazine is advanced toward the work holder and projecting it across the channel when the magazine is withdrawn, for advancing the next blank of the series into gripped engagement with said dog, and a pusher arranged to exert force yieldably on blanks in the magazine back of said feeder toward the work holder.

5. A work piece loading mechanism for a machine tool comprising a magazine having a channel disposed to hold a row of blank work pieces and having an open delivery end, a carrier on which said magazine is mounted, a spring pressed dog mounted on the carriage arranged to hold the endmost one of a series of blanks in a prescribed position adjacent to the delivery end of the channel, a feed finger mounted independently of the carriage with provisions for movement in a path crossing said channel at a distance from the delivery end of the channel equal to the combined width of a number of work pieces, and cam means mounted on the carriage in operative relation to cause traverse of said finger into and out of said channel in consequence of movements of the carriage in opposite directions.

6. In a machine tool, a supporting structure, a carriage mounted thereon with provisions for movement back and forth, a magazine mounted on said carriage having a channel extending in the direction of movement of the carriage adapted to hold a series of blank work pieces and having an open delivery end, mechanism for moving said carriage so that the delivery end of the magazine is brought to a delivering position and withdrawn from such position, a yieldable holder cooperatively arranged to hold the endmost one of a series of blanks in a prescribed position contiguous to the delivery outlet, a pusher on the carriage having a projection extending into said channel and being actuated to propel work pieces in the channel toward the delivery outlet, a lever pivotally mounted on the supporting structure adjacent to the magazine having a feed finger and an operating arm, said feed finger extending laterally toward the blank holding channel in the magazine and being displaceable across and away from said channel by movement of the lever, and a cam element mounted on the carriage in controlling relation with the operating arm of the lever, arranged to cause withdrawal of the feed finger when the magazine is carried toward the delivery point and to project the finger across the channel when the magazine is withdrawn.

7. In a machine tool, the combination with a supporting structure, of a work piece magazine mounted with provisions for back and forth movement on said supporting structure, having a channel adapted to contain a series of blank work pieces, means for moving said magazine in its prescribed path comprising an oscillatable driving arm and a lever pivoted to the supporting structure in force transmitting relation between said driving arm and the magazine, an adjustable stop connected with the magazine arranged to bear on an abutment portion of the supporting structure when the magazine has been moved to a prescribed limit in one direction, a dog carried by the magazine yieldingly actuated to hold a blank in a definite position with respect to the delivery outlet of the magazine, a feeder, and means for operating said feeder periodically to advance blanks to such position.

JOHN D. DAVIS.

REFERENCES CITED

The following references are of record in the file of this patent:

UNITED STATES PATENTS

| Number | Name | Date |
|---|---|---|
| 328,365 | Vinton | Oct. 13, 1885 |
| 1,478,313 | Wilcox | Dec. 18, 1923 |
| 2,372,596 | Miller | Mar. 27, 1945 |
| 2,389,083 | Rosengren | Nov. 13, 1945 |